United States Patent Office 3,798,326
Patented Mar. 19, 1974

3,798,326
5,5 - DIMETHYL - 10 - HYDROXY-8-(3-METHYL-2-OCTYL)-2-(2-PROPYNYL) - 1,2,3,4-TETRAHYDRO-5H - (1)BENZOPYRANO[3,4-d]PYRIDINE AS AN ANTI-HYPERTENSIVE AGENT
Louis Selig Harris, Chapel Hill, N.C., Harry George Pars, Lexington, and Raj Kumar Razdan, Belmont, Mass., assignors to Sharps Associates, Cambridge, Mass.
No Drawing. Filed Aug. 24, 1972, Ser. No. 283,440
Int. Cl. A61k 27/00
U.S. Cl. 424—263
2 Claims

ABSTRACT OF THE DISCLOSURE

A method of reducing blood pressure in hypertensive mammalian patients comprising administering a therapeutically effective amount of 5,5-dimethyl-10-hydroxy-8-(3-methyl - 2 - octyl)-2-(2-propynyl)-1,2,3,4-tetrahydro-5H-[1]benzopyrano[3,4-d]pyridine to said patient.

DETAILED DESCRIPTION OF THE INVENTION

This invention relates to a method of treating hypertension using 5,5-dimethyl-10-hydroxy-8-(3-methyl-2-octyl)-2-(2-propynyl)-1,2,3,4-tetrahydro - 5H - [1]benzopyrano[3,4-d]pyridine as an anti-hypertensive agent.

5,5-dimethyl-10-hydroxy-8-(3-methyl - 2 - octyl)-2-(2-propynyl)-1,2,3,4 - tetrahydro-5H-[1]benzopyrano[3,4-d]pyridine has previously been reported to be useful as a central nervous system depressant (see U.S. Pat. No. 3,576,798). It has now been found that the compound possesses anti-hypertensive activity and is useful in lowering blood pressure in hypertensive patients.

The compound is represented by the formula

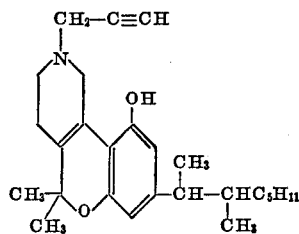

The compound can be prepared according to the method taught in U.S. Pat. No. 3,576,798.

The anti-hypertensive activity of the compound useful in the practice of this invention has been demonstrated in several species of hypertensive test animals, i.e., in neurogenic hypertensive dogs and in genetically hypertensive rats. However, the compound has been found to have minimal direct cardiovascular effects in normotensive animals at the therapeutic dosages.

In the practice of this invention, 5,5-dimethyl-10-hydroxy - 8 - (3-methyl - 2 - octyl)-2-(2-propynyl)-1,2,3,4-tetrahydro-5H-[1]benzopyrano[3,4-d]pyridines is administered to hypertensive mammalian patients in dosages of 0.01 to 10 mg./kg. of body weight daily, preferably in divided dosages, i.e., three to four times daily. The compound exhibits anti-hypertensive activity when administered by both oral and parenteral routes; however, the oral route is the preferred route of administration.

The following examples further illustrate this invention:

EXAMPLE 1

Six beagle dogs of either sex were trained to lie supine on the dog board. Arterial blood pressure was recorded by a direct percutaneous puncture of the femoral artery by a 22 gauge needle, which was then connected to the Statham pressure transducer. Heart rate was counted from the standard lead II electrocardiogram. Respiratory rate and the general behavior of each dog was monitored continuously. Renal hypertension was established in two animals by the technique described by Goldblatt et al., J. Expt. Med., 59, 347 (1934) where the renal arteries were constricted bilaterally. Neurogenic hypertension was produced in two animals by bilateral denervation of the buffer nerves to the cartoid sinus and aortic arch areas and sectioning of the cardiac depressor nerves [Nowak, Ann. of Surgery, 111, 102 (1940)]. Heart rate and arterial blood pressure were recorded on a Grass polygraph and transmitted simultaneously to an IBM 1800 digital computer for calculation. Dosages of 0.1 mg./kg. of the compound were administered intraveneously to each dog.

The compound produced a moderate increase in arterial blood pressure and a slight increase in heart rate initially in each of the neurotensive and renal hypertensive dogs. However, this effect ceased 50 to 60 minutes after drug administration. However, in the neurogenic hypertensive animals, the compounds produced a marked decrease in blood pressure and heart rate starting from within 5 minutes after drug administration and lasting at least one hour after drug administration.

EXAMPLE 2

Oral activity of 5,5-dimethyl-10-hydroxy-8-(3-methyl-2-octyl)-2-(2-propynyl) - 1,2,3,4 - tetrahydro-5H-[1]benzopyrano[3,4-d]-pyridine in the conscious spontaneously hypertensive rat Indirect tail blood pressure measurements were accomplished in the following way: all rats were kept in a soundproof room, with constant light and constant temperature (25° C.) and fed rat chow ad lib. Before measuring systolic blood pressure and heart rate each rat was warmed for a period of 8–10 minutes in a warming box (Carter Electronics) at a temperature of 39–40° C. The rats were held in a cylindrical wire holder during the warming period and during the subsequent recording period (during which time the rats were removed from the warming box). An occluding cuff, attached by tygon tubing to a Tycos pressure manometer was placed on the tail near the base and a microphone (Carter Electronics) was placed adjacent and distal to the occluding cuff. Systolic blood pressure was measured by slowly inflating the cuff until no audible pulse sound could be detected in the earphones. This value, read on a Tycos manometer, was recorded as the systolic blood pressure. A total of seven measurements were made in a similar manner for each rat within a period of 1–2 minutes and the data was averaged to give the mean systolic blood pressure. The heart rate was recorded immediately after this, counting the beats audible for 15 seconds from which beats/minute were calculated. This heart rate measurement was also repeated seven times. On each day, at 0900 hours, the systolic blood pressure and heart rate were recorded for each animal and the compound (1 mg./kg.) dissolved in PEG 400 (0.1 cc./100 gm. body weight) was then administered by gavage. Measurements for heart rate and systolic blood pressure were made again 4 hours after the drug administration.

The compounds markedly lowered systolic blood pressure 4 hours after drug administration. Blood pressure recorded at 0900 hours on each successive day after drug administration was substantially lower than on the previous day, suggesting that the drug produces a sustained fall in blood pressure. The data are summarized in the following table:

TABLE

[Effect of daily oral administration of 5,5-dimethyl-10-hydroxy-8-(3-methyl-2-octyl)-2-(2-propynyl)-1,2,3,4-tetrahydro-5H-[1]benzopyrano[3,4-d]pyridine on systolic blood pressure and heart rate in the genetic hypertensive rat]

| Day [1] | Time of day | SBP ± S.D. (8) [2] | HR ± S.D. (8) [2] |
|---|---|---|---|
| 1 | 0900 | 255.9±28 | 444.8±27.7 |
|   | 1345 | 206.0±23 | 446.5±37.9 |
| 2 | 0900 | 227.5±18 | 436.0±42.6 |
|   | 1345 | 197.9±26 | 389.6±36.9 |
| 3 | 0900 | 211.6±26 | 441.0±53.8 |
|   | 1345 | 185.0±25 | 454.6±46.2 |
| 4 | 0900 | 197.2±25 | 473.0±46.3 |
|   | 1345 | 166.4±14 | 452.2±70.4 |
| 5 | 0900 | 189.9±17 | 475.2±52.8 |
|   | 1345 | 158.6±19 | 438.2±65.5 |
| 6 | 0900 | 188.0±20 | 439.0±58.9 |
|   | 1345 | 148.9±34 | 430.9±52.1 |
| 7 | 0900 | 208.6±12.6 | 435.8±39.8 |
|   | 1345 | 181.4±9.8 | 437.9±75.9 |
| 8 [3] | 0900 | 212.9±17.7 | 494.4±77.0 |
|   | 1345 | 209.8±20.9 | 481.9±62.0 |
| 9 [3] | 0900 | 250.4±17.7 | 411.0±46.2 |
|   | 1345 | 248.5±11.8 | 416.9±67.6 |
| 10 | 0900 | 241.5±25.2 | 418.5±68.8 |
|    | 1345 | 214.4±31.3 | 387.1±57.6 |
| 11 | 0900 | 236.6±22.2 | 403.8±68.8 |
|    | 1345 | 218.4±16.9 | 395.0±63.3 |
| 12 | 0900 | 223.9±30.7 | 442.8±74.4 |
|    | 1345 | 200.8±20.0 | 412.5±68.1 |
| 13 | 0900 | 216.1±5.0 | 439.8±74.2 |
|    | 1345 | 197.1±22.9 | 393.5±78.4 |

See footnotes at end of table.

[1] On each day, the compound or the vehicle (PEG 400, 0.1 ml./100 gm. rat weight) was given at 0945 hours and the measurements were made starting at 1345 hours. Data represented the mean ± S.D. values obtained from a series of 8 animals.
[2] SBP=Systolic blood pressure; HR=heart rate.
[3] PEG rather than drug was administered.

The compound useful in the practice of this invention can be formulated into various pharmaceutically acceptable dosage forms such as tablets, capsules, pills and the like for immediate or sustained release, by combining the compound with a suitable pharmaceutically acceptable carrier or diluent according to methods well known in the art. Such dosage forms may additionally include lubricants, excipients, binders, fillers, flavoring and sweetening agents and other therapeutically inert ingredients necessary for the formulation of the desired preparation.

We claim:

1. A method of reducing blood pressure in hypertensive patients comprising administering to said patient a therapeutically effective amount of 5,5-dimethyl-10-hydroxy-8-(3-methyl - 2 - octyl)-2-(2-propynyl)1,2,3,4-tetrahydro-5H-[1]benzopyranol[3,4-d]pyridine.

2. The method of claim 1 wherein said compound is administered in dosages of from 0.1 to 10.0 mg./kg. of body weight daily.

References Cited

UNITED STATES PATENTS 3,576,798   4/1971   Pars et al. _____ 260—240

STANLEY J. FRIEDMAN, Primary Examiner